Jan. 6, 1942. C. W. WOLFE 2,269,093
METHOD AND APPARATUS FOR HANDLING SKELP
Filed July 5, 1939 2 Sheets-Sheet 2
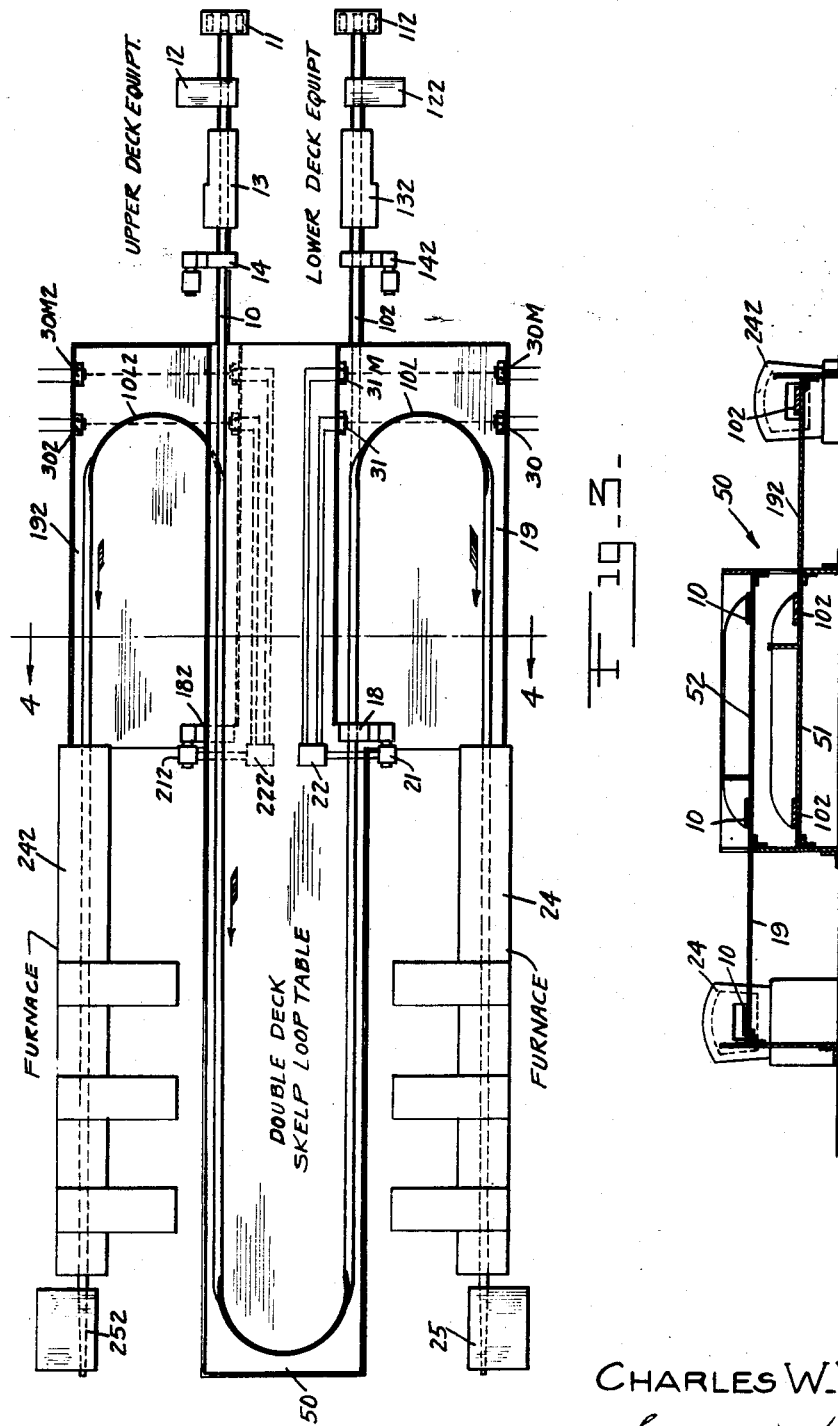
Inventor
CHARLES W. WOLFE
By Francis J. Kleinpaugh
Attorney Patented Jan. 6, 1942

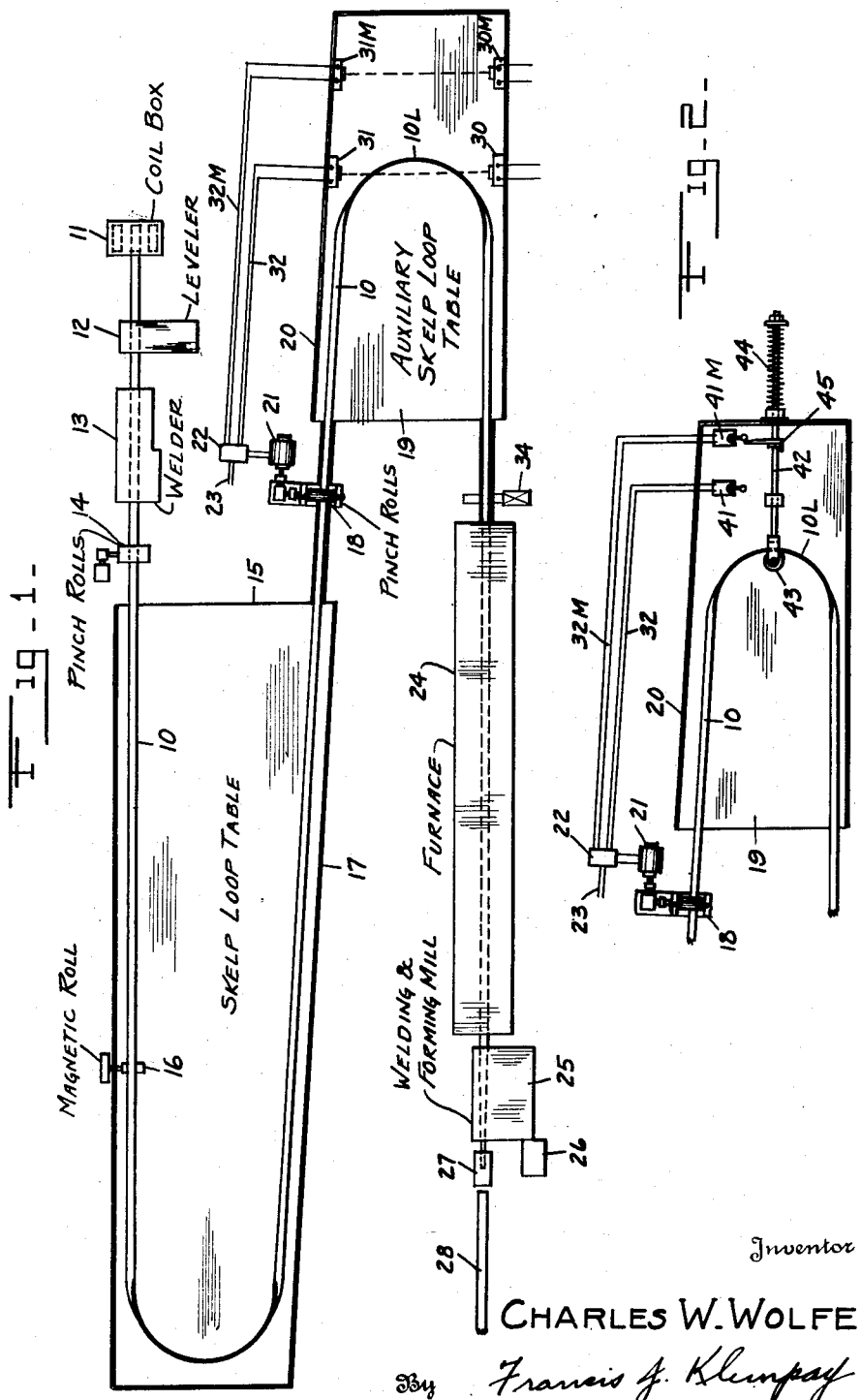

2,269,093

UNITED STATES PATENT OFFICE 2,269,093

METHOD AND APPARATUS FOR HANDLING SKELP

Charles W. Wolfe, Salem, Ohio, assignor to The Salem Engineering Company, Salem, Ohio, a proprietorship Application July 5, 1939, Serial No. 282,886

7 Claims. (Cl. 266—3)

This invention relates to a method and apparatus for handling steel skelp in continuous production processes utilizing such material and more particularly to an arrangement whereby the skelp may be taken from coils or other stock batches, welded into a continuous length and supplied continuously to an apparatus utilized in the production process in such manner that the skelp may be supplied to such apparatus at a constant predetermined speed of travel, while the tractive effort required to move the skelp to or through the apparatus remains substantially constant whereby substantially improved results are attained in the operation of the process. While the invention is particularly applicable in the handling and furnishing of continuous skelp in the Fretz-Moon process of manufacturing butt-welded pipe and the specific embodiment to be disclosed herein utilizes the invention in such relation, it should become obvious as the description proceeds that the invention is applicable to other specific uses.

In the Fretz-Moon process for manufacturing butt-welded tube an elongated heating furnace is usually employed to bring the skelp and particularly its edges up to substantially welding temperature, which is of the order of approximately 2850° F., at which termperature the edges of the skelp approach the softening point. The strip or skelp is subjected to edgewise blasts of air to further increase the temperature at the edges as the strip issues from the furnace and the strip is then passed through a forming and welding mill which converts the flat strip into tube. By reason of the high temperatures required to be maintained in the major portion of the heating furnace, it is not practical to employ any positive skelp moving means in the furnace and accordingly the rolls of the forming and welding mill are relied upon to pull the skelp through the furnace. Since the metal is in a highly heated condition as it issues from the furnace, the tractive effort exerted by the mill aforesaid must be uniformly and evenly applied to avoid elongation or the pulling apart of the skelp. Such tractive effort or integrated tension in the skelp itself is necessarily variable in accordance with the weight and friction of the skelp being moved inasmuch as the rate of travel of the skelp is kept constant and in the event the resistance to movement of the skelp varies difficulty is encountered in correlating the various operating values of the process. An increase in the tension existent in the heated stock may result in elongation therein with a consequent reduction in cross-sectional area, variation in the quality of the weld effected, and variation in the thickness of the wall of the tube manufactured.

The present invention has as its principal object the obviating of the objectionable operating characteristic of the involved process outlined above and this is accomplished by reducing the tractive effort or tension required to draw the skelp through the furnace and by enabling such effort or tension to remain substantially uniform while the rate of progression of the skelp remains constant.

Another object of the invention is the provision of an improved plant lay-out for furnishing continuous skelp or strip from coils or other stock batches to essential apparatus of a continuous pipe mill or to other apparatus requiring a continuous unbroken supply of such material which lay-out substantially reduces the overall length of plant area required for the complete installation of the pipe mill or other apparatus, thereby providing a more economical and easier controlled grouping of the various elements. In the Fretz-Moon process, for example, the heating furnace, the forming and welding mill, cut-off, and run-out table, being positioned in line, require a very long space for their installation and by means of the present invention the extra length of space required to handle the skelp preparatory to its admittance to the furnace is minimized.

These and other objects and advantages of the invention will become apparent from a consideration of the following detailed specification and accompanying drawings wherein there is specifically disclosed preferred embodiments of the invention.

In the drawings:

Figure 1 is a schematic plan view of a plant for making pipe according to the Fretz-Moon process embodying the principles of the present invention;

Figure 2 is a modified form of loop control which may be substituted for a corresponding control of Figure 1;

Figure 3 is a schematic plan view of a Fretz-Moon plant utilizing two furnaces and welding assemblies and a double deck primary loop table embodying the principles of the present invention; and Figure 4 is a schematic sectional view along the line 4—4 of Figure 3.

Referring to Figure 1 of the drawings, the pipe stock or skelp, indicated generally by reference numeral 10, is normally supplied, in accordance with usual practice, in coils containing approximately 185-550 linear feet, depending on the width and gauge of the material, and the stock is unreeled from the coils when the latter are placed in a coil box, indicated by reference numeral 11, or when placed on other uncoiling apparatus and from the coils the stock passes through a roller leveler 12 and thence to a welder and flash trimmer 13 which welds the trailing end of the strip from a preceding coil to the leading end of the strip coming from the coil on the uncoiling device. The strip then is moved by a pair of driven pinch rolls 14 onto a primary loop table 15 having an upwardly directed flange 17 to retain the strip or skelp on the table. A driven magnetic roll 16 may be employed to assist the movement of the skelp along its looped path of travel. The purpose of the loop on table 15 is to provide a reservoir of material which may be drawn from by the welding and forming mill when the supply of skelp to the table is interrupted during the interval that the weld is being effected between the lengths of skelp by the welder 13. Thus, when rolls 14 are stopped the loop on table 15 will be shortened as the material is drawn therefrom and will lengthen back to its original size upon completion of the welding and scarfing operation and resumption of operation of the feed rolls 14.

According to the first illustrated embodiment of the invention, skelp 10 is drawn from table 15 and moved onto an auxiliary table 19 by a pair of pinch rolls 18 which are driven by a motor 21. Table 19 is likewise provided with a flange 20 to prevent the skelp from moving off of it. A portion of the table 19 is aligned with the longitudinal axis of the pass through heating furnace 24 and the skelp forms a second loop 10L on the table 19 to position the skelp leaving said table on said axis. From the table 19 the skelp is pulled through the furnace 24 by the rolls of the welding and forming mill 25 driven by a motor 26. Mill 25 is operative to form the flat skelp into tubular form and then butt weld the opposing edges of the skelp to complete the tubular structure. The tube so formed is cut to accurate lengths by a flying saw 27 and then conveyed to cooling racks by the run-out table 28.

It is now common operating practice in plants of the kind illustrated to form and weld the pipe at speeds ranging from 75 to 300 feet per minute, depending on the width and gauge of the stock used, and it should be apparent that, if only a single loop table, as the table 15, were employed, the length of the loop on the table would vary considerably due to the starting and stopping of the pinch rolls feeding the material thereto and this would result in substantial variation in the length of the skelp being pulled through the furnace by the welding and forming mill. Such variation in length requires substantial variation in the tractive effort or integrated tension inherent in the skelp itself to maintain the required constant speed of travel of the skelp through the mill. As explained above, the variation tension increases the possibility of stretching out the hot skelp and of pulling it apart and renders difficult the correlation of the speed and pressures used in the welding and forming mill, the control of the air blast on the side edges of the skelp as it issues from the furnace and the control of the furnace itself. The present invention seeks to provide constant and uniform operating conditions including the tension applied to the skelp at the leaving end of the furnace and this is accomplished by maintaining substantially fixed the length of skelp drawn by the rolls of the welding and forming mill. Accordingly, means is provided to maintain substantially constant the length of the loop formed by the skelp 10 on the auxiliary table 19.

Motor 21, which drives the feed rolls 18, is energized from a line 23 through a suitable controller 22. Light sources 30 and 30M are mounted in spaced relation along one side of the table 19 and photo-electric cells 31 and 31M are positioned opposite the light sources on the other side of the table. A control circuit 32 interconnects photo-electric cell 31 with the controller 22 and a control circuit 32M interconnects photo-electric cell 31M with the controller 22. The operation of the controller 22 is such that, as the loop 10L increases in length and intercepts the light beam to the light responsive device 31M, motor 21 is deenergized to stop the supply of skelp to the table 19. As the loop decreases in length due to the consumption of the skelp by the mill and moves out of the path of the light beam to the light sensitive device 31, the motor 21 is again energized to resume the feeding of the skelp to the table. Suitable interlocking means is provided in the controller 22 to prevent the interception of the beam 30—31 from deenergizing motor 21 and likewise to prevent the cessation of the interception of light beam 30M—31M from resuming the energization of the motor 21. During normal operation of the plant the peripheral speed of the rolls 18 is substantially equal to the rate of movement of the skelp through the furnace as drawn by the mill 25 in order that the position of the loop 10L will normally remain the same, which is preferably somewhere between the beams of light aforementioned. The loop control above described is effective in compensating for slippage and other irregularities which might occur in the handling movement of the skelp.

Figure 2 illustrates a modified arrangement for controlling the position of the looped end 10L of the skelp 10 on the table 19. In accordance with this modification, a dancer comprising a longitudinally movable spring biased shaft 42 having a roll 43 to engage the inner surface of the loop is employed to operate minimum and maximum limit switches 41 and 41M, respectively. A controller 22 to control the energization of motor 21 from line 23 is employed as in the embodiment first described, a control circuit 32 interconnecting controller 22 with switch 41 and a second control circuit 32M interconnecting controller 22 with limit switch 41M. An arm 45 secured to shaft 42 alternately engages the operating arms of the switches 41 and 41M and the shaft 42 is biased outwardly by a spring 44. As the looped end 10L moves to the left, as viewed in Figure 2, by reason of the decrease in the total length of stock on the table 19, arm 45 engages switch 41 which closes switch 32 and the operation of the controller 22 is such that this will result in energization of motor 21. Such energization will continue so long as the looped end 10L remains in its proper position or until the end moves so far outwardly that the arm 45 engages switch 41 and through circuit 32M and controller 22 deenergizes motor 21.

Figure 3 illustrates a plant lay-out, embodying the principles of the invention, in which two complete production lines for the manufacture of tubes according to the Fretz-Moon process are employed. Each production line assembly is identical with and includes all the elements specifically described above in connection with the plant illustrated in Figure 1 of the drawings. For convenience one of the production line assemblies of Figure 3 bears reference numerals identical with the numerals of Figure 1, while the reference numerals applied to the other of the assemblies are identical with the first but are each provided with the suffix 2 in order that the associated parts in a particular assembly might easily be identified.

The plant lay-out of Figures 3 and 4 includes two continuous heating furnaces 24 and 242 of the kind described above in conection with Figure 1 of the drawings and associated therewith are the welding and forming mills 25 and 252, respectively. These furnaces and mills may conveniently be positioned in slightly different elevations, as indicated in Figure 4. The furnaces are preferably positioned in spaced parallel relation, as indicated in Figure 3, and between the furnaces there is positioned a double deck skelp loop table 50 provided with a lower deck 51 and an upper deck 52, each of the decks performing the function of the table 15 of the first described embodiment in conection with the particular line elements with which they are respectively associated. Thus the upper deck of the double deck skelp loop table 50 is arranged to accommodate the first or primary loop in the stock 10 as the stock issues from the coil box 11, leveler 12, welder 13 and pinch rolls 14. From the upper deck 52 the stock passes along a loop on the auxiliary skelp loop table 19 and thence into the furnace 24 and the forming and welding assembly 25. As in the first described embodiment, the position of the loop on the table 19 is controlled by the photo-electric cell or dancer mechanism herein specifically mentioned or by equivalent means.

In the other production line of the plant of Figure 3 the stock drawn through the other furnace 242 and utilized in the mill 252 is looped initially on the lower deck 51 of the double deck skelp loop table 50 and thence passes along the looped path 192 before entering the furnace. This stock, indicated by reference numeral 102, is furnished by the uncoiling mechanism 112 and passes through the leveler 122, welder 132 and pinch rolls 142 before passing onto the lower deck 51. The means described is also employed to control the position of the loop on the table 192.

The lay-out of Figures 3 and 4 possesses all of the advantages enumerated above in connection with the single furnace installation of Figures 1 and 2 and in addition enables further economies to be effected in the installation and control of the assembled apparatus when a number of furnaces and mills are employed for large quantity production. The provision of the double deck loop table materially reduces the building space required for the installation of the double production line and facilitates the installation of the various equipment used.

It should now be apparent that I have provided an improved method and apparatus for handling metal strip or skelp from coils or other stock batches to a continuously moving uninterrupted supply of such strip or skelp which accomplishes the objects initially set out. The use of the invention enables definite economies to be effected in the space requirements of plants requiring handling of strip or skelp in the manner indicated and that the use of the invention in conjunction with essential apparatus for the continuous production of pipe according to the Fretz-Moon process is advantageous is borne out by the fact that improved results in the functioning of the apparatus is attainable due to the better correlation which is possible to be maintained between the various operating values inherent in the continuous process. In addition to the advantages specifically pointed out above, the provision of the secondary loop and its positional control, which enables a constant speed of stock travel to be maintained with a constant integrated tension in the stock, results in lesser variation in the overall diameter of the tube being formed. Thus tolerances in the outer diameter as well as in the wall thickness are more easily maintained. Due to the high stock speed employed in modern practice, the primary loop table must be approximately 125 feet long and, if this were added to the length of the furnace welding and forming mill, cut-off, run-out table and spaces intervening therebetween, the resulting plant would be unduly long and difficult to control. The auxiliary loop table of the present invention need only be about 45 feet long, thereby reducing the required space in length by at least 80 feet.

The above specifically described embodiments of my invention should be considered as illustrative only as obviously many changes may be made therein without departing from the spirit or scope of the invention.

What I claim is:

1. Apparatus for continuously supplying skelp to a device working on said skelp comprising primary and secondary loop tables over which said skelp moves in looped paths before passing to said device, means to intermittently move the skelp onto said primary loop table, means to move the skelp from said primary loop table onto said secondary loop table, and means to control the position of the end of the loop in said skelp on said secondary loop table.

2. Apparatus for continuously supplying skelp to a device working on said skelp comprising primary and secondary loop tables over which said skelp moves in looped paths before passing to said device, means to intermittently move the skelp onto said primary loop table, means to move the skelp from said primary loop table onto said secondary loop table, and means responsive to the position of the end of the loop in said skelp on said secondary loop table in control of said second mentioned moving means.

3. Apparatus for continuously supplying skelp to a device working on said skelp comprising means to move said skelp through said device at a constant rate of travel, primary and secondary loop tables associated with said device and over which the skelp travels along looped paths before passing to said device, means to intermittently move the skelp onto said primary loop table, means to move the skelp from said primary loop table onto said secondary loop table, and means to control the position of the end of the loop in said skelp on said secondary loop table.

4. Apparatus for continuously supplying skelp to a device working on said skelp comprising means to move said skelp through said device at a constant rate of travel, primary and secondary loop tables associated with said device and over which the skelp travels along looped paths before passing to said device, means to intermittently move the skelp onto said primary loop table, means to move the skelp from said primary table onto said secondary loop table, and means responsive to the position of the end of the loop in said skelp on said secondary loop table in control of said third mentioned moving means.

5. Apparatus of the character described comprising a pair of spaced continuous skelp heating furnaces, a table having two decks positioned between sair furnaces, each if said decks adapted to support a looped length of skelp, and means associated with said furnaces to draw skelp from said decks through said furnaces.

6. The method of continuously supplying skelp to a device working on said skelp and having means to draw the skelp therethrough at a uniform rate of travel which consists of moving said skelp along a sinuous path of travel having at least two loops therein, feeding the skelp to the first of said loops from an intermittent source of supply thereof, and moving the skelp from the said first of the loops of said path to the second of the loops of said path in accordance with the position of the end of said second loop relative to said device whereby said device will be furnished with a continuous and uninterrupted supply of skelp while the tractive effort required to move the skelp through said device will be substantially uniform.

7. Apparatus for continuously supplying skelp to a device working on said skelp comprising means to move said skelp through said device at a constant rate of travel, primary and secondary loop supports associated with said device and over which the skelp travels along successive looped paths before passing to said device, a pair of pinch rolls to move the skelp from an intermittent source of supply onto said primary support, a pair of pinch rolls to move the skelp from said primary support onto said secondary support, and means responsive to the position of the end of the loop in said skelp on said secondary support relative to said device in control of said second mentioned pinch rolls whereby said device will be furnished with a continuous and uninterrupted supply of skelp while the tractive effort required to move the skelp through said device will be substantially uniform.

CHARLES W. WOLFE.